(12) United States Patent
Bemis et al.

(10) Patent No.: US 8,910,524 B2
(45) Date of Patent: Dec. 16, 2014

(54) LINKED BRIDGE PRESSURE TRANSDUCER ASSEMBLIES

(75) Inventors: Andrew Bemis, Upper Saddle River, NJ (US); Timothy Nunn, Ridgewood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 363 days.

(21) Appl. No.: 13/315,075

(22) Filed: Dec. 8, 2011

(65) Prior Publication Data

US 2013/0145854 A1  Jun. 13, 2013

(51) Int. Cl.
*G01L 9/04* (2006.01)

(52) U.S. Cl.
USPC .............. 73/720; 73/715; 73/719; 73/753

(58) Field of Classification Search
None
See application file for complete search history.

(56) References Cited

U.S. PATENT DOCUMENTS

| | | | | |
|---|---|---|---|---|
| 4,444,056 | A * | 4/1984 | Romo | 73/708 |
| 4,528,855 | A * | 7/1985 | Singh | 73/721 |
| 4,565,097 | A * | 1/1986 | Dimeff | 73/765 |
| 5,681,997 | A * | 10/1997 | McHale et al. | 73/727 |
| 6,518,880 | B2 * | 2/2003 | Tanizawa | 340/514 |
| 6,581,468 | B2 * | 6/2003 | Clifford | 73/715 |
| 7,061,311 | B2 * | 6/2006 | Kilian | 330/6 |
| 7,284,440 | B2 * | 10/2007 | Kurtz et al. | 73/753 |
| 7,526,962 | B1 * | 5/2009 | Kurtz et al. | 73/721 |
| 8,561,470 | B2 * | 10/2013 | Kurtz et al. | 73/721 |

* cited by examiner

*Primary Examiner* — Lisa Caputo
*Assistant Examiner* — Jermaine Jenkins
(74) *Attorney, Agent, or Firm* — Troutman Sanders LLP; James E. Schutz; Christopher Close

(57) ABSTRACT

A gage/differential pressure transducer assembly having enhanced output capabilities, comprising a first pressure port adapted to communicate a first pressure to a first sensor, the first sensor comprising a first Wheatstone bridge adapted to output a first signal indicative of the first pressure, wherein the first pressure is a main pressure; and a second pressure port adapted to communicate a second pressure to a second sensor, the second sensor comprising a second Wheatstone bridge adapted to output a second signal indicative of the second pressure, wherein the second pressure is a reference pressure; and an output port connected to the first Wheatstone bridge and the second Wheatstone bridge for outputting a third signal representative of the difference between the first and second pressures.

16 Claims, 3 Drawing Sheets

LINKED BRIDGE PRESSURE TRANSDUCER ASSEMBLIES

TECHNICAL FIELD

The present invention relates to gage and/or differential pressure transducer assemblies.

BACKGROUND

Differential pressure transducers comprising two absolute sensors present several advantages over standard differential pressure transducer configurations having one sensor. For example, standard differential pressure transducers have a narrow diameter tube that directs a reference pressure to the back side of the diaphragm, while the front side of the diaphragm receives a main pressure. Such tubing increases the likelihood that a blockage will occur and adversely affect the transducer. Further, such tubing interferes with the transducer's frequency response characteristics for reference port signals. Differential pressure transducers having two sensors, however, eliminate the need for such tubing and therefore eliminate the adverse effects associated with such tubing. Additional benefits of differential transducers having two sensors are further described and highlighted in U.S. Pat. No. 4,695,817.

Prior art embodiments of differential transducers having two sensors, however, have certain limitations. For example, differential transducers having two sensors have a reduced output when compared to standard differential transducers. This reduction in output is caused by the electrical configuration of the transducer, as the main pressure port and the reference pressure port each utilize a half bridge silicon strain gage Wheatstone bridge circuit sensor. Each half bridge is then combined to form a Wheatstone bridge circuit that responds to the differential or gage pressure between the main pressure port and the reference pressure port.

Thus, there is a need for a gage/differential pressure transducer assembly that utilizes two sensors and has an improved output. It is to this need that the present invention is directed.

BRIEF SUMMARY OF INVENTION

Exemplary embodiments of the present invention provide a gage/differential pressure transducer assembly having enhanced output capabilities, comprising a first pressure port adapted to communicate a first pressure to a first sensor, the first sensor comprising a first Wheatstone bridge adapted to output a first signal indicative of the first pressure, wherein the first pressure is a main pressure; and a second pressure port adapted to communicate a second pressure to a second sensor, the second sensor comprising a second Wheatstone bridge adapted to output a second signal indicative of the second pressure, wherein the second pressure is a reference pressure; and an output port connected to the first Wheatstone bridge and the second Wheatstone bridge for outputting a third signal representative of the difference between the first and second pressures.

Other exemplary embodiments of the present invention provide a method of measuring gage/differential pressure, comprising receiving and sensing a first pressure; outputting a first signal indicative of the first pressure via a first Wheatstone bridge; receiving and sensing a second pressure; outputting a second signal indicative of the second pressure via a second Wheatstone bridge; and outputting a third, final signal indicative of the difference between the first and second signals.

DETAILED DESCRIPTION OF PREFERRED EMBODIMENTS

Figure 1:
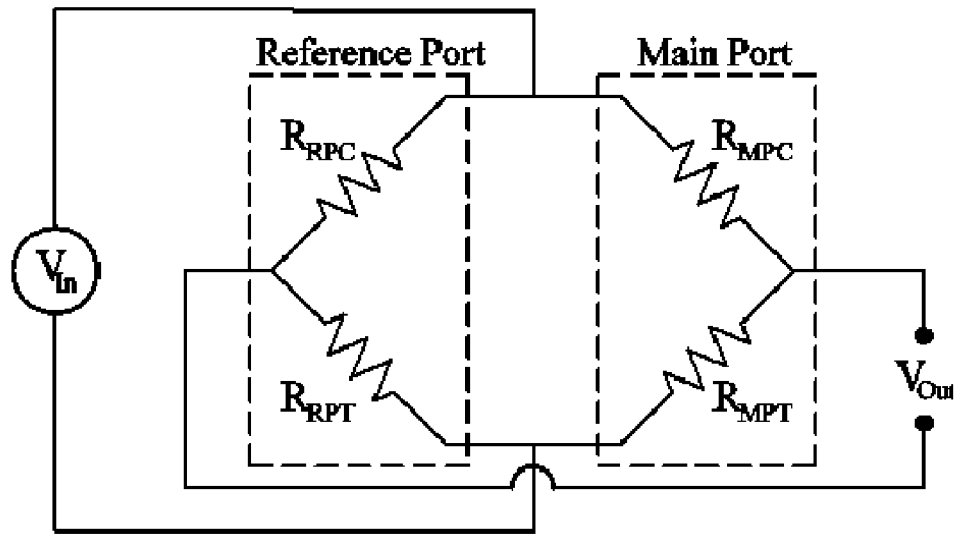
FIG. 1 illustrates a prior art embodiment of a gage/differential transducer assembly utilizing two half Wheatstone bridges.

Although preferred embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an," and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose. It shall be understood that the use of the term "pressure transducer" herein shall encompass both gage and differential pressure transducers. It shall also be understood that while the first pressure port is generally referred to as the main pressure port and the second pressure port is generally referred to as the reference pressure port, that the first and second pressure ports can be used interchangeably to refer to the main or reference pressure port.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Referring now to the drawings, in which like numerals represent like elements, exemplary embodiments of the present invention are herein described. It is to be understood that the figures and descriptions of the present invention have been simplified to illustrate elements that are relevant for a clear understanding of the present invention, while eliminating, for purposes of clarity, many other elements found in typical pressure sensor assemblies and methods of making and using the same. Those of ordinary skill in the art will recognize that other elements are desirable and/or required in order to implement the present invention. However, because such elements are well known in the art, and because they do not facilitate a better understanding of the present invention, a discussion of such elements is not provided herein.

Exemplary embodiments of the present invention provide a pressure transducer assembly that has improved output capabilities. The pressure transducer assembly of the present invention utilizes full Wheatstone bridge circuits within both the reference and main ports, which enables the pressure transducer assembly to generate a higher output level than prior art embodiments. The pressure transducer assembly of the present invention also allows for multiple Wheatstone bridges to be linked together within each port to provide for even greater transducer output.

The pressure transducer assembly of the present invention comprises a first pressure port, a second pressure port, and an output port. The first pressure port, i.e., the "main" pressure port, communicates a first pressure to a first sensor, the first sensor comprising a first Wheatstone bridge. The first Wheatstone bridge is adapted to output a first signal indicative of the first pressure. In exemplary embodiments, the first pressure is a main pressure. The second pressure port, i.e., the "reference" pressure port, is adapted to communicate a second pressure to a second sensor, the second sensor comprising a second Wheatstone bridge. The second Wheatstone bridge is adapted to output a second signal indicative of the second pressure. In exemplary embodiments, the second pressure is a gage or reference pressure. The output port is connected to the first and second Wheatstone bridges and outputs a third signal indicative of the difference between the first pressure and the second pressure. In exemplary embodiments, the first, second, and third signals are voltage signals.

Referring to FIG. 1, there is shown electrical circuitry of a prior art embodiment of a differential pressure transducer utilizing two half Wheatstone bridges. A first pressure is applied to a first sensor housed in the main port, which places the semiconductor strain gage $R_{MPT}$ (Main Port Tensile) in tension and increases its resistance, while the value of semiconductor strain gage $R_{MPC}$ (Main Port Compression) simultaneously decreases, as this gage is placed in compression. The reference port works in a similar way. A second pressure is applied to a second sensor housed in the reference port, which increases the value of the $R_{RPT}$ (Reference Port Tension) gage and decreases the value of the $R_{RPC}$ (Reference Port Compression) gage. Assuming the ratio of resistance change to applied pressure is identical for all the gages within the transducer, the final voltage output is substantially proportional to the applied pressure difference between the main and reference ports, as demonstrated in Equation 1.

$$V_{Out} = V_{In}\left[\left(\frac{R_{MPT}}{R_{MPC} + R_{MPT}}\right) - \left(\frac{R_{RPT}}{R_{RPC} + R_{RPT}}\right)\right] \quad \text{Equation 1}$$

This prior art pressure transducer embodiment, however, only utilizes one half of a traditional Wheatstone bridge circuit in each port assembly, thus the maximum output from each port is half the output that is available from a full Wheatstone bridge circuit. Exemplary embodiments of the gage/differential pressure transducer assembly, however, utilize full Wheatstone bridge circuits within each port, and combine the outputs to generate a higher output level.

Figure 2:
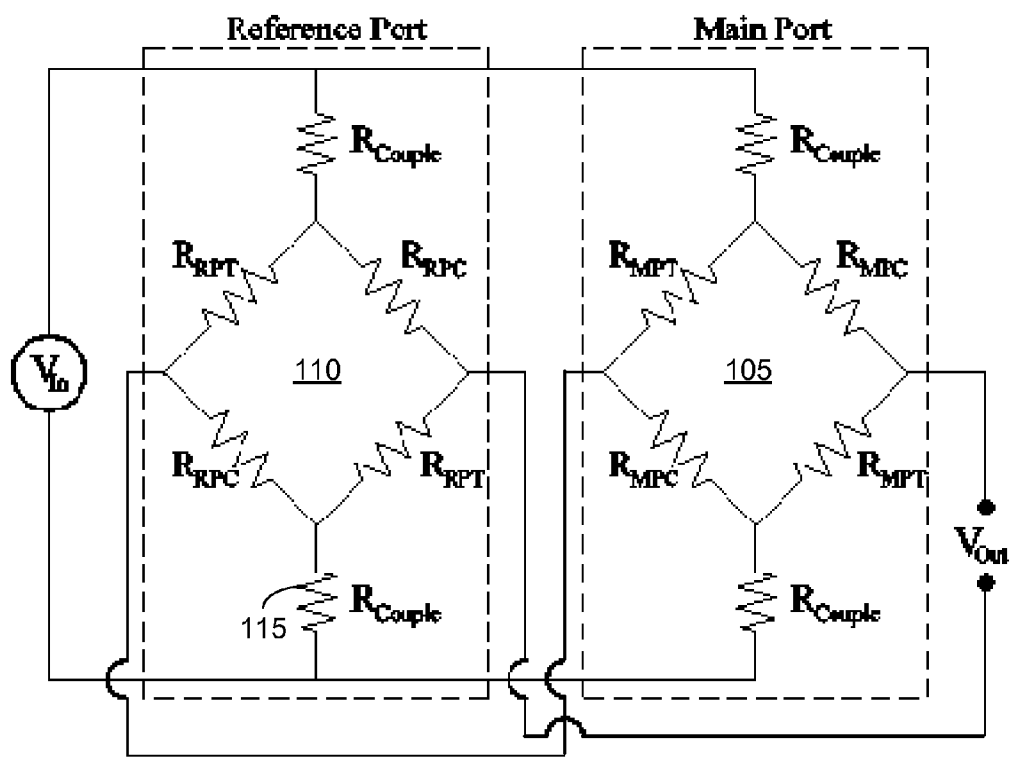
FIG. 2 illustrates an exemplary embodiment of a gage/differential transducer assembly of the present invention utilizing two full Wheatstone bridges.

Referring to FIG. 2, there is shown electrical circuitry of the pressure transducer assembly of the present invention. This pressure transducer operates in the same manner as the transducers of the prior art discussed above, however, the main and reference ports communicate first and second pressures to first and second sensors, respectively, wherein both first and second sensors comprise full Wheatstone bridges. As illustrated, the main Wheatstone bridge 105 and the reference Wheatstone bridge 110 are linked together. Specifically, the negative output terminal of the main Wheatstone bridge 105 is connected to the negative output terminal of the reference Wheatstone bridge 110 and coupling resistors 115 are added in series between the input voltage and the positive input terminals of the main and reference Wheatstone bridge circuits 105/110. Coupling resistors 115 can also be added in series between the input voltage return and the negative input terminals of the reference and main Wheatstone bridge circuits 110/105. In preferred embodiments, the main and reference sensors are of the same sensitivity; however, embodiments having sensors with slightly different sensitivities can utilize slightly different coupling resistors 115 to better match the sensitivities of the sensors. In prior art embodiments, the sensors have to be of the same sensitivity, which further limits its configuration. It shall also be understood that coupling resistors 115 between the positive supply terminals and the positive bridge terminals and between the negative bridge terminals and the negative supply terminals are not simultaneously required for operation. Rather, in some embodiments, one pair of terminals may include a coupling resistor and the other pair of terminals may be shorted together. This configuration, however, reduces the enhanced output.

Figure 3:
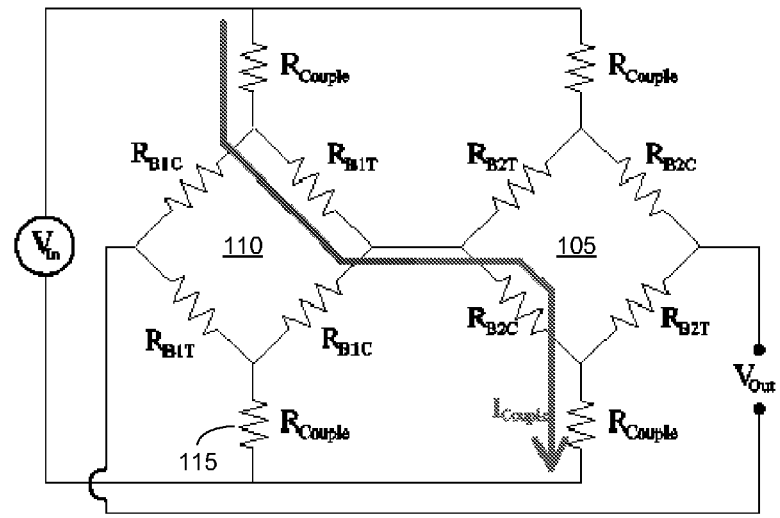
FIG. 3 illustrates an exemplary embodiment of the gage/differential transducer assembly of the present invention with a coupling current.

Referring to FIG. 3, there is shown another illustration of the electrical circuitry of the pressure transducer of the present invention. FIG. 3, however, illustrates the operation of the overall linked bridge circuit and highlights the interaction of the link between the two Wheatstone bridge circuits 105/110 and the coupling resistors 115. To simplify the analysis of the output results, a coupling current, $I_{Couple}$, is used for the derivation of the voltage and current characteristics of the circuit. The output voltage, $V_{Out}$, is proportional to the applied pressure difference between the main and reference ports and as Equation 2 provides, $V_{Out}$ is defined as the difference between the first and second signals from the main and reference ports, respectively, referenced to ground. In exemplary embodiments, the first, second, and output signals are voltages.

$$V_{Out} = V_{GND}^+ - V_{GND}^- \quad \text{Equation 2}$$

Equations 3 and 4 define the voltage signals at the main and reference port output terminals with respect to circuit ground, respectively. $V_B$ is the voltage across the basic Wheatstone bridge circuit, which is substantially the same for both the main and reference Wheatstone bridges 105/110. Also, for ease of analysis the coupling resistors 115 are set to have the same value, $R_{Couple}$.

$$V_{GND}^- = V_B \frac{R_{B1T}}{R_{B1T} + R_{B1C}} + I_{Nom} R_{Couple} \quad \text{Equation 3}$$

$$V_{GND}^+ = V_B \frac{R_{B2T}}{R_{B2T} + R_{B2C}} + (I_{Couple} + I_{Nom}) R_{Couple} \quad \text{Equation 4}$$

Equation 5 substitutes Equations 3 and 4 into Equation 2, and adequately represents the interaction of the two linked bridges utilizing coupling current, $I_{Couple}$. Specifically, Equation 5 shows the effect the linkage between the Wheatstone bridges 105/110 and the coupling resistors 115 have on enhancing the final output as compared to the half bridge embodiments of the prior art. The output of the pressure transducer assembly of the present invention is increased by multiplying the coupling current with the coupling resistor value, therefore distinguishing it from prior art embodiments. Notably, as provided in Equation 5, if the coupling resistors 115 are set to zero, the output voltage of the circuit will revert to the standard configuration of the prior art embodiments. Conversely, Equation 5 also provides that, as the value of the coupling resistors 115 increases, the coupling between the reference and main Wheatstone bridges 105/110 increases and, consequently, the value of the output voltage increases.

$$V_{Out} = V_B \left( \frac{R_{B2T}}{R_{B2T} + R_{B2C}} - \frac{R_{B1T}}{R_{B1T} + R_{B1C}} \right) + I_{Couple} R_{Couple} \quad \text{Equation 5}$$

Figure 4:
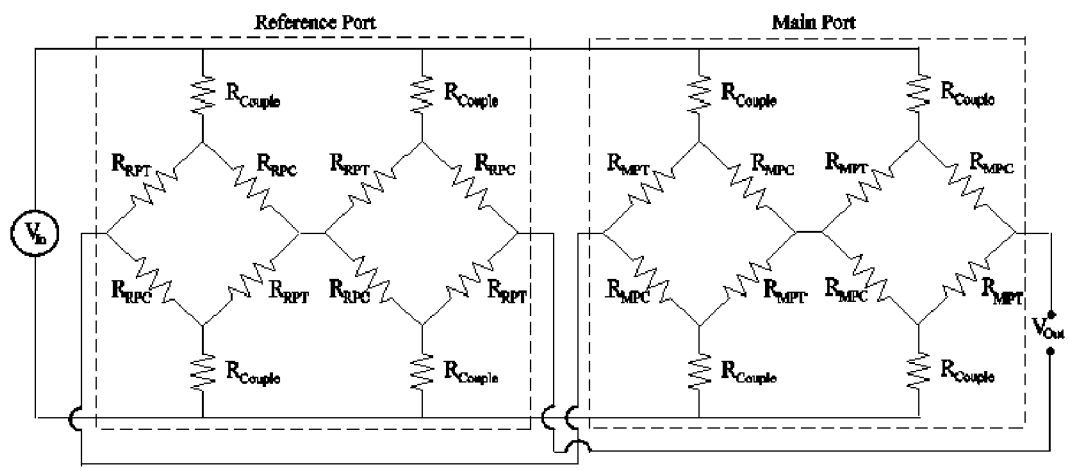
FIG. 4 illustrates an exemplary embodiment of a gage/differential transducer assembly of the present invention utilizing a plurality of full Wheatstone bridges.

In other exemplary embodiments, multiple sensors and thus multiple Wheatstone bridges may be linked within the reference and main ports, as illustrated in FIG. 4, to provide an even greater output. Referring to FIG. 4, there is shown two Wheatstone bridges in the reference port and two Wheatstone bridges in the main port, which provides an additional advantage that the sensitivity of the sensors need to be similar, and not identical, as the sensitivities can be matched using slightly different coupling resistor values.

Figure 5:
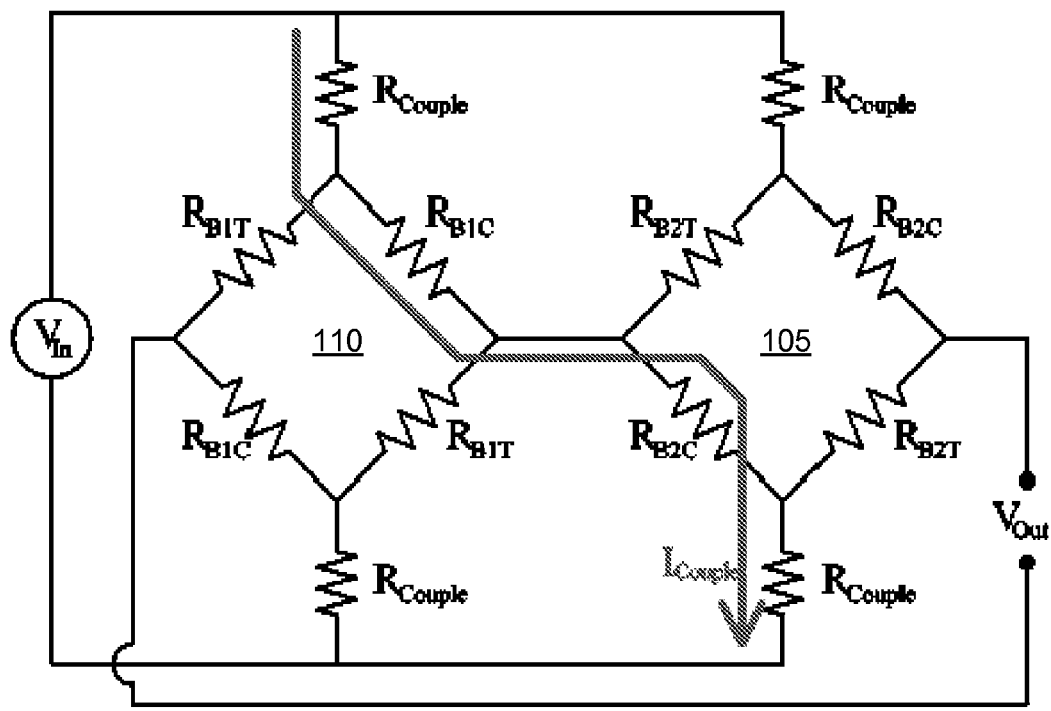
FIG. 5 illustrates an exemplary embodiment of the gage/differential transducer assembly of the present invention with a coupling current.

Referring to FIG. 5, there is shown a simplified illustration of FIG. 4 demonstrating the operation of the multiple Wheatstone bridges, which highlights the interaction of the link between the Wheatstone bridge circuits and the coupling resistors. As in the embodiment illustrated in FIG. 2, a coupling current, $I_{Couple}$, is again used for the derivation of the voltage and current characteristics of the circuit to simplify the analysis of the results. Again, Equation 6 defines the output voltage as the difference between the first and second signals from the main and reference ports, respectively, referenced to ground.

$$V_{Out} = V_{GND}^+ - V_{GND}^- \quad \text{Equation 6}$$

Equations 7 and 8 define the voltage at the main and reference port output terminals with respect to circuit ground. $V_B$ is the voltage across the basic Wheatstone bridge circuit, which is essentially the same for both bridges. Also, for ease of analysis, the coupling resistors are set to all have the same value, $R_{Couple}$.

$$V_{GND}^- = V_B \frac{R_{B1C}}{R_{B1T} + R_{B1C}} + I_{Nom} R_{Couple} \quad \text{Equation 7}$$

$$V_{GND}^+ = V_B \frac{R_{B2T}}{R_{B2T} + R_{B2C}} + (I_{Couple} + I_{Nom}) R_{Couple} \quad \text{Equation 8}$$

Equation 9 is the solution to the analysis of the linked Wheatstone bridge circuit given by FIG. 5 utilizing a coupling current, $I_{Couple}$, to illustrate the interaction of the linked bridges.

$$V_{Out} = V_B \left( \frac{R_{B2T}}{R_{B2T} + R_{B2C}} - \frac{R_{B1C}}{R_{B1T} + R_{B1C}} \right) + I_{Couple} R_{Couple} \quad \text{Equation 9}$$

Equation 9, similar to Equation 5, provides the effect the linkage between the Wheatstone bridges and the coupling resistors has in enhancing the output of this device over a single bridge version. Notably, the output is increased by multiplying the coupling current with the coupling resistor value, therefore distinguishing it from prior art embodiments. If the coupling resistors 115 are set to zero, the output voltage of the circuit will revert to the standard configuration of the prior art embodiments. Conversely, Equation 9 also provides that, as the value of the coupling resistors 115 increases, the coupling between the reference and main Wheatstone bridges 105/110 increases and, consequently, the value of the output voltage increases.

Additionally, if desired, standard thermal compensation techniques can be used on the bridges to compensate for thermal errors. In some embodiments, coupling resistors with individually tailored coefficient of resistance (TCR) values may be used to enhance the thermal compensation characteristics. In other embodiments, the coupling resistors may all be of the same low TCR value. In embodiments where the coupling resistors have the same TCR value as the corresponding Wheatstone bridge circuit, the outputs and corresponding thermal compensation characteristics are greatly enhanced. It is also possible to compensate for slight mismatches in sensor sensitivity by slightly altering the coupling resistors, as previously described.

By using two or more full Wheatstone bridges for a gage/differential pressure transducer assemblies, the output of the transducer assemblies is increased while maintaining the benefits of having two separate pressure capsules, which allows for a pressure sensor capable of accurately measuring lower pressure differentials and low level pressure signals superimposed on a high line pressure.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A gage/differential pressure transducer assembly having enhanced output capabilities, comprising:
    a first pressure port adapted to communicate a first pressure to a first sensor, the first sensor comprising a first Wheatstone bridge adapted to output a first signal indicative of the first pressure;
    a second pressure port adapted to communicate a second pressure to a second sensor, the second sensor comprising a second Wheatstone bridge adapted to output a second signal indicative of the second pressure; and
    an output port connected to the first Wheatstone bridge and the second Wheatstone bridge for outputting a third signal representative of the difference between the first and second pressures, wherein the first Wheatstone bridge and the second Wheatstone bridge are linked by a plurality of coupling resistors.

2. The transducer assembly of claim 1, wherein the first pressure is a main pressure and the second pressure is a reference pressure.

3. The transducer assembly of claim 1, wherein the first sensor comprises a plurality of Wheatstone bridges.

4. The transducer assembly of claim 1, wherein the second sensor comprises a plurality of Wheatstone bridges.

5. The transducer assembly of claim 1, wherein compensation techniques are utilized to compensate for thermal errors associated with the first, second, and third signals.

6. The transducer assembly of claim 1, wherein the coupling resistors have individually tailored coefficients of resistance to enhance thermal compensation characteristics.

7. The transducer assembly of claim 1, wherein the coupling resistors are of the same coefficient of resistance value as the corresponding first and second Wheatstone bridge circuits to enhance outputs and thermal compensation characteristics.

8. The transducer assembly of claim 1, wherein the first, second, and third signals are voltage signals.

9. A method of measuring gage and differential pressure with enhanced output, comprising:
   receiving and sensing a first pressure and outputting a first signal indicative of the first pressure via a first Wheatstone bridge;
   receiving and sensing a second pressure and outputting a second signal indicative of the second pressure via a second Wheatstone bridge; and
   outputting a third signal representative of the difference between the first and second pressures, wherein the first and second Wheatstone bridges are linked with coupling resistors.

10. The method of claim 9, wherein the first pressure is a main pressure and the second pressure is a reference pressure.

11. The method of claim 9, further comprising outputting the first signal indicative of the first pressure via a plurality of Wheatstone bridges.

12. The method of claim 9, further comprising outputting the second signal indicative of the second pressure via a plurality of Wheatstone bridges.

13. The method of claim 9, further comprising utilizing compensation techniques to compensate for thermal errors associated with the first, second, and third signals.

14. The method of claim 9, wherein the first, second, and third signals are voltage signals.

15. A method of measuring gage and differential pressure with enhanced output, comprising:
   receiving and sensing a first pressure and outputting a first signal indicative of the first pressure via a first Wheatstone bridge;
   receiving and sensing a second pressure and outputting a second signal indicative of the second pressure via a second Wheatstone bridge; and
   outputting a third signal representative of the difference between the first and second pressures, wherein coupling resistors having individually tailored coefficient of resistance values are utilized to enhance thermal compensation characteristics.

16. The method of claim 15, wherein the coupling resistors have the same coefficient of resistance values as the corresponding first and second Wheatstone bridge circuits, and wherein the coupling resistors having the same coefficient of resistance values are utilized to enhance outputs and corresponding thermal compensation characteristics.

* * * * *